(12) United States Patent
Haberfelde et al.

(10) Patent No.: US 8,223,423 B2
(45) Date of Patent: Jul. 17, 2012

(54) DYNAMIC REFLECTARRAY TECHNOLOGY FOR ELECTRO-OPTICAL SENSORS

(75) Inventors: Thomas E Haberfelde, Clermont, FL (US); Edit L. Braunstein, Gainesville, VA (US); Glenn Boreman, Geneva, FL (US); James Ginn, Longwood, FL (US); David Shelton, Winter Park, FL (US); Gene D. Tener, Oviedo, FL (US); Andrew H. Hawkins, Orlando, FL (US)

(73) Assignee: Lockheed Martin Corp., Bethesda, MD (US)

( * ) Notice: Subject to any disclaimer, the term of this patent is extended or adjusted under 35 U.S.C. 154(b) by 459 days.

(21) Appl. No.: 12/549,938

(22) Filed: Aug. 28, 2009

(65) Prior Publication Data

US 2010/0118377 A1 May 13, 2010

Related U.S. Application Data

(60) Provisional application No. 61/092,445, filed on Aug. 28, 2008.

(51) Int. Cl.
*G02F 1/03* (2006.01)
*G02B 5/08* (2006.01)

(52) U.S. Cl. .......... 359/263; 359/247; 359/850
(58) Field of Classification Search .......... 359/201.1, 359/201.2, 204.1–204.4, 212.1, 213.1, 223.7, 359/224.1, 224.2, 225.1, 226.1, 226.2, 245–247, 359/259, 265, 290–292, 298, 315, 316, 318, 359/319, 320, 850, 851, 865
See application file for complete search history.

(56) References Cited

U.S. PATENT DOCUMENTS

2009/0195859 A1* 8/2009 Wagner et al. .......... 359/298
* cited by examiner

*Primary Examiner* — Dawayne A Pinkney
(74) *Attorney, Agent, or Firm* — Birch, Stewart, Kolasch & Birch, LLP (57) ABSTRACT

An array of two or more tunable electro-optical reflecting elements where the phase response of one or more elements may be adjusted by a variety of approaches including, but not limited to: a liquid crystal superstrate, schottky contact(s), ultra-violet radiation pulses, and illumination of photoconductive substrates. Methods and apparatus for direct and/or adaptive control of phase response via the above approaches are also discussed.

25 Claims, 9 Drawing Sheets

DYNAMIC REFLECTARRAY TECHNOLOGY FOR ELECTRO-OPTICAL SENSORS

BACKGROUND

1. Field of the Invention

The present invention relates generally to tunable electro-optical reflectarrays and, more particularly, to tunable infra-red reflectarrays and to several particular tunable infra-red reflectarray structures.

2. Description of Related Art

Reflectarrays are traditionally passive, planar microstrip antenna arrays designed for discrete reflected phase manipulation at each individual antenna element making up the array. By spatially varying the phase response of the antenna array, reflectarrays allow a planar surface to impress a non-planar phasefront on the reflected radiation, for example, a spherical wavefront. Initially proposed as a low-cost replacement for mechanically bulky parabolic reflectors, reflectarrays have been successfully developed and utilized at both radio (RF) and millimeter-wave (mmW) frequencies.

From basic reflectarray theory, the phase response of a single reflectarray element may be regulated by three core factors: the response of the ground plane, the response of the patch element by itself, and inter-element coupling between the element and the array. Patch element size and coupling parameters are difficult to modify post-fabrication, although techniques are available to modify the response of the groundplane. Furthermore, it is preferable to perform any type of modification beneath the groundplane to maintain as high of a system reflectivity as possible.

By definition, infrared reflectarrays consist of an array of resonant, sub-wavelength microstrip elements which, when excited, re-radiate in a specified pattern with an arbitrary phase front. Thus, it is possible for a physically flat reflectarray to provide focusing or collimation with a potentially smaller footprint and weight than an analogous polished element. In terms of behavior, reflectarrays share many similarities to phased arrays with each microstrip element of the array resonating with a progressive phase difference to achieve a desired far-field directivity.

Figure 1:
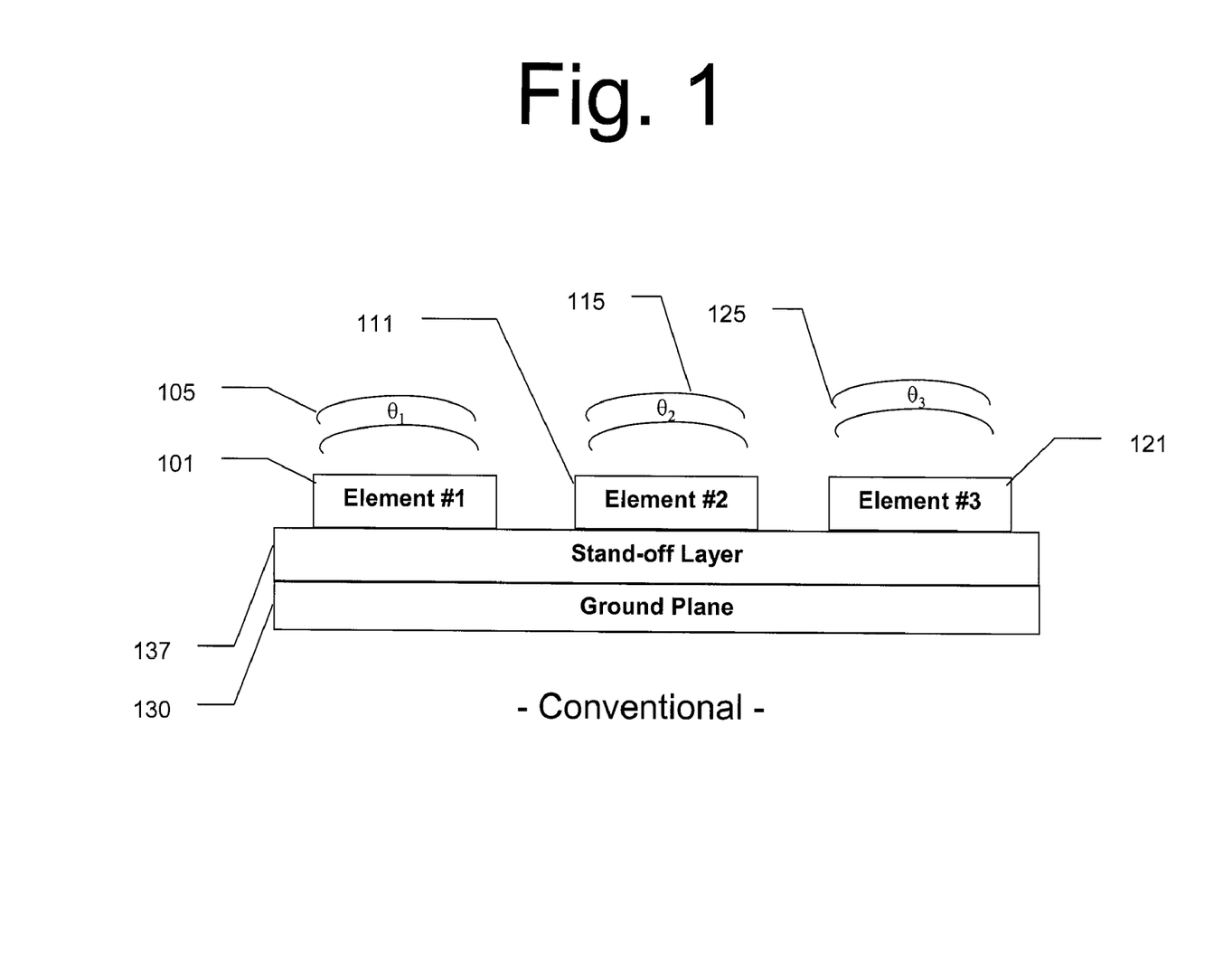
FIG. 1 shows a conventional infra-red reflectarray having multiple elements with different phase responses.

An embodiment of a conventional static infra-red reflectarray is depicted in FIG. 1. The active elements of the reflectarray 101, 111, 121 each have an associated phase response 111, 115, 125 based on the particular composition, electrical properties, and spatial orientation of the element. The elements are separated from a ground plane 130 by a stand-off layer 137.

For infrared reflectarrays currently in development, elements and ground planes may be comprised of gold or aluminum and the stand-off layer may be comprised of Zirconium Dioxide or a commercially available spin on polymer such as benzocyclobutene (BCB). The resonant phase delay of each discrete element upon illumination may be determined by a number of factors:

(1) Material properties of the elements, ground plane, or standoff layer;
(2) Shape of the elements (currently patches are used, however other shapes may be employed for specific effects or ranges of effect);
(3) spacing/periodicity of the elements;
(4) height of the stand-off layer; and
(5) element dimensions.

Similar to RF designs, most static infrared reflectarrays only vary element dimensions, both for ease of design and ease of fabrication. When a static reflectarray is radiated with a plane wave of uniform phase front, all of the elements will be excited in phase, but will re-radiate out of phase, with a designed delay given by the dimensions of the element.

In the case of patch elements, re-radiation by individual elements may be directed, fairly uniformly, in all directions away from the ground plane. Due to differences in phase response of the elements in the array; however, re-radiation in the far-field may only occur in a specified direction (neglecting side or grating lobes) due to interference between all of the elements. In configurations where the main lobe is directed off of the normal, specific lobe tilt may be determined by the distance between the elements and the progressive phase difference between the elements.

A reflectarray's performance may be improved by reducing the reflection loss of patch elements. This may be accomplished by increasing the thickness of the substrate layer to reduce loss introduced by the band gap of the resonant patches while increasing the bandwidth of the reflectarray element. This increase in substrate thickness may, however, cause a decrease in overall phase variation. This may be mitigated by using patches loaded with particular arrangements of slots.

Reflectarray layouts, in the case of normally incident collimated or spherical wave illumination, follow a layout analogous to a graded Fresnel zone plate (FZP). For the reflectarray, elements may be placed into periodic zones expanded out from the center of the device based on the element's phase. In a particular embodiment of a reflectarray, it was calculated that a phase step size of 45 degrees per element would be required to achieve 95% focusing efficiency into the primary zone. More complicated embodiments; such as for designs requiring off-axis illumination, would require more intricate layouts.

To provide a progressive phasing across the surface of the reflectarray to impose a spherical phase front, a layout generator may be required to place reflectarray elements for optimal performance. Such a generator may be accomplished via a software program or a hardware device.

One readily apparent disadvantage of existing reflectarray technology is that the reflectarray, once fabricated, generates one particular reflection pattern. A reflectarray whose particular individual elements may be dynamically tuned would allow for variation in reflected phase fronts and therefore provide capabilities such as beam steering. Although available for radio-frequency (RF) wavelengths, such reflectarrays have so far been realized by loading each individual element into the array to effectively vary their dimensions dynamically. Specifically, in the radio-frequency band, reflectarray elements may be individually loaded with discrete electronics. This approach is not feasible for reflectarrays with large numbers of elements, such as infrared reflectarrays, given that an infrared reflectarray may have on the order of 10 million elements with element sizes less than 5 microns, which all must be loaded and tuned.

The realization of an effective tunable infrared reflectarray presents special challenges as most of the methods used to create tunable millimeter wave reflectarray fail in the IR frequency range due to RC time constant limitations, antenna size restrictions, optical/electrical properties of materials at IR frequencies, or other problems related to the frequency.

SUMMARY OF THE INVENTION

Reflectarray tuning at infrared may be accomplished by several embodiments of a tunable reflectarray, including: Liquid Crystal Superstrate, Schottky Contact Tunable Ground Plane, UV Tunable Ground Plane and Photoconductive Tunable Ground Plane. These embodiments may also be applied for reflectarray tuning at other wavelengths, and embodiments more suitable for other wavelengths may also be applied for reflectarray tuning in at infrared, including embodiments suitable for RF reflectarray tuning applications.

The above-listed embodiments may all operate on the principles of introducing additional phase shifts at local points across the reflectarray. These local changes may shift the main lobe of the reflectarray in the same fashion as the reflectarray elements themselves, but at a more macro scale. In such embodiments, a phase shift at each localized point may be close to the desired shift in the direction of the main lobe.

The above-listed embodiments may be further combined with an adaptive controller that adjusts the phase response of the array, or portions thereof, in response to changes in operating conditions, user commands, predetermined focusing or steering patterns, certain detected radiation signals, or other relevant factors. Such a controller may include components such as a tuning circuit, tuning controller, and a phase response detector and/or calculator. Further embodiments may include variations that allow for user override features, control signal inputs, and control of discrete or overlapping array sections or multiple arrays.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given herein below and the accompanying drawings which are given by way of illustration only, and thus are not limitative of the present invention, and wherein.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Liquid Crystal Superstrate

For liquid crystal (LC) superstrate embodiments, one or more cells of liquid crystal elements may be placed on top of the reflectarray. Certain types of liquid crystal are optically anisotropic materials with a permittivity that varies based upon molecular orientation of the molecules that comprise the LC.

This variable permittivity may be utilized in embodiments of tunable infra-red reflectarrays by applying an LC superstrate on top of a fixed infra-red reflectarray. In such an embodiment, shown in FIG. 2, a liquid crystal 210 having its molecules in a uniform alignment is disposed between layers of polyimide 230 may be positioned on top of a static infra-red reflectarray that has reflective elements 260, a stand-off layer, and a ground plane 250. In some LC superstrate embodiments, an LC cell may cover multiple reflectarray elements. In such embodiments, the bottom layer of polyimide may be configured such that it fills the gaps 220 between individual reflectarray elements.

Figure 2:
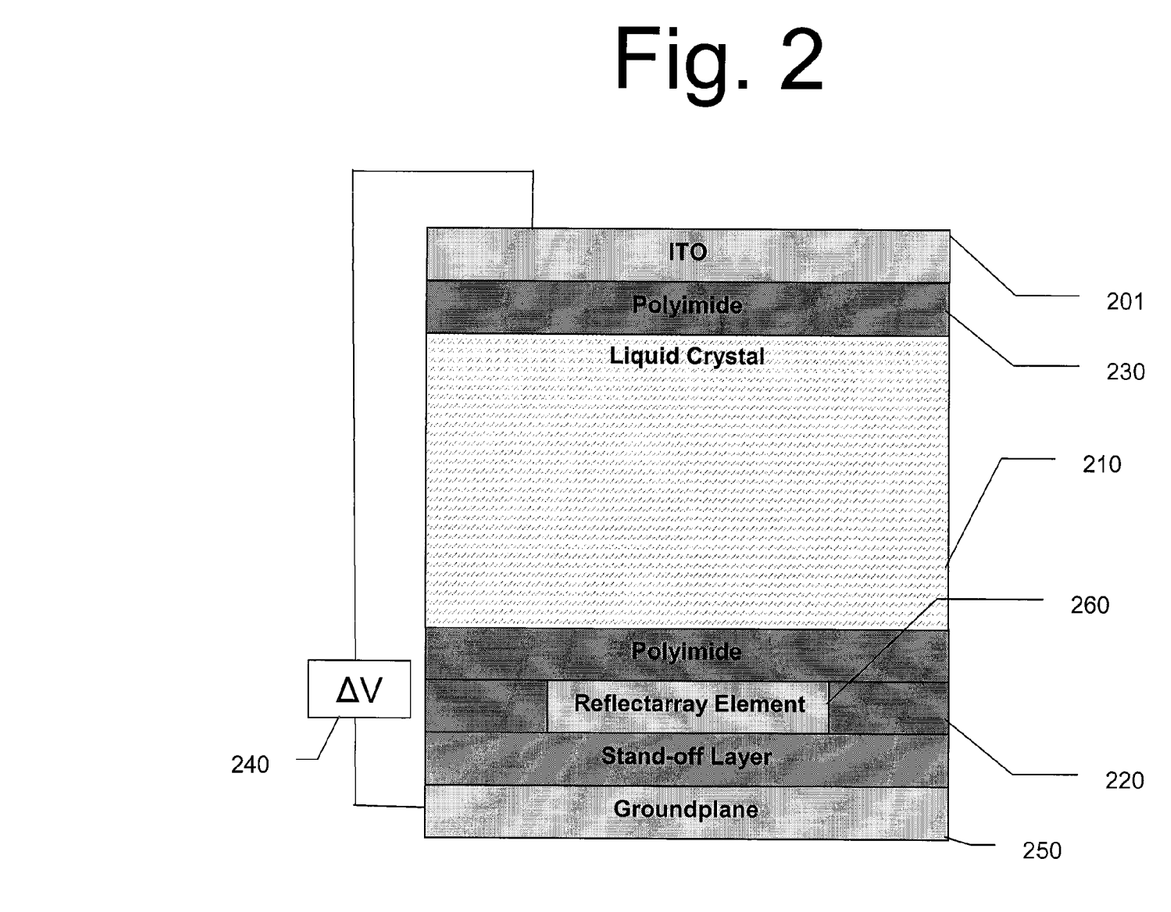
FIG. 2 shows an embodiment of a tunable electro-optical reflectarray with a liquid crystal superstrate according to the present invention.

The ground plane 250 and a top layer of indium tin oxide (ITO) 201 may be connected to an electrical source 240. Alternate embodiments may employ different material compositions such as transparent semiconductors like ZnO, polysilicone, CNT sheets or any other material with the properties of transparent semiconductors. Embodiments of LC material formulations may include proprietary material formulations or combinations that may be configured for specific applications or based on particular operating requirements.

The electrical source may generate an electric field that uniformly alters the orientation of the LC molecules. As the molecular orientation of the LC changes, so does its permittivity. By disposing multiple LC cells on a reflectarray, the phase response of different portions of the reflectarray may be dynamically adjusted by controlling the electric field and thereby the permittivity of the LC superstrate. In some embodiments, the voltage may be varied as a function of time to dynamically change the response of the array. In further embodiments, it may be possible to dispose individually controlled LC cells on top of each element of the reflectarray. Further embodiments may employ a large LC panel that allows for regional changes in orientation in different portions of the LC through voltage or permittivity gradients across a large LC plane that covers multiple reflectarray elements.

Unlike embodiments of path difference beamsteering LC systems, the phase response of the reflectarray is also tuning due to near-field interaction between a reflectarray element and the LC cell above it. The local electromagnetic environment of one or more reflectarray elements may be changed by the changes in the LC layer, thereby altering the resonant properties of the element or elements being tuned.

Embodiments of LC superstrate tuned reflectarrays may also be combined with Schottky Contact or UV-based embodiments discussed below for broader tunable ranges or by stacking more complex control materials on top of the reflectarray that may allow for broader a broader chromatic spectrum or a wider tunability range.

Schottky Contact Tunable Ground Plane

Figure 3A:
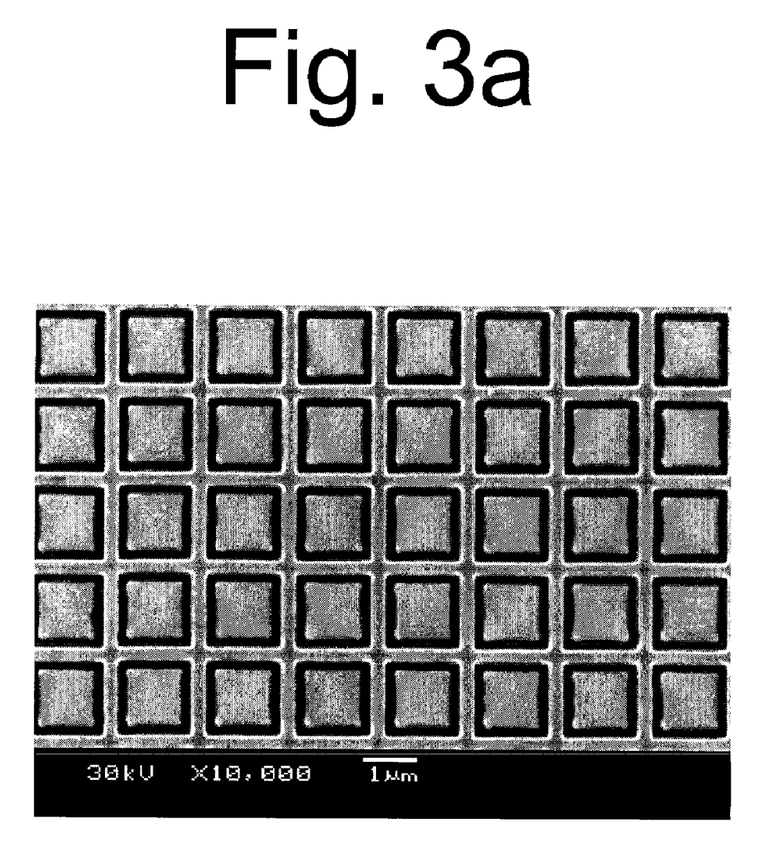
FIG. 3a shows an embodiment of a portion of an infrared frequency-selective surface that may be tuned according to the present invention.

Some embodiments of tunable reflectarrays may be realized by using a ground plane whose reflectivity varies as a function of frequency. In such embodiments, a slotted-periodic array may be used as a ground plane for a reflectarray. Embodiments of a tunable slotted array may be fabricated using a ground plane, a stand-off layer, and slot elements. Similar to a static reflectarray, the ground plane slots may also resonate and have a magnitude of reflectivity dependent on the permittivity of the stand-off layer. FIG. 3a shows an embodiment of a reflectarray having slot elements. In the embodiment depicted, the Schottky contact portion is represented by the continuous metallic region around the individual patches of the array.

Figure 3B:
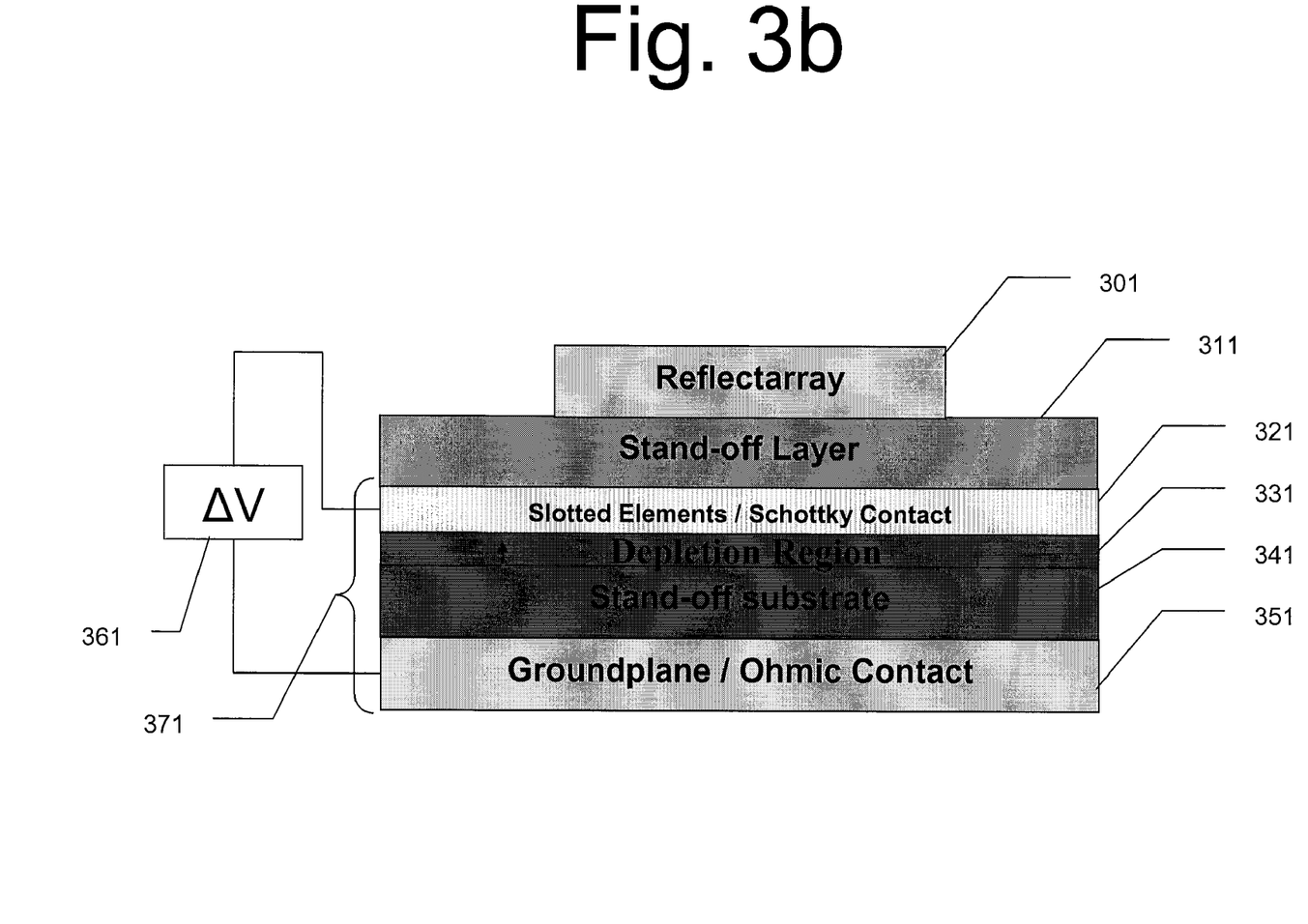
FIG. 3b shows an embodiment of a tunable electro-optical reflectarray having a Schottky Contact and/or slotted ground plane according to the present invention.

FIG. 3b shows an embodiment of a reflectarray element disposed on a ground plane with a Schottky contact array disposed thereon. The Schottky Contact 331 in some embodiments may include a reflectarray of the type depicted in FIG. 3a. An embodiment of a Schottky junction may be formed between a semiconductor stand-off substrate 341 and metal slot elements 321. Embodiments may employ doped or un-doped Silicon, or may employ other semiconductor types such as InSb, GaAs, and similar materials. In a p-doped or n-doped Si embodiment, there may be a depletion region 331 in the semiconductor where free electrons from the metal have combined with holes in the semiconductor. Within this region the dopants contribution to the permittivity may be neutralized, and the depletion region may have the permittivity of intrinsic Si.

As an increasing electric potential 361 is applied across the Schottky contact the boundary of the depletion region 331 may shift further into the stand-off substrate 341, which may be epitaxial Si. Such a shift may result in a thicker section with the depletion region permittivity and a thinner section with the stand-off substrate layer permittivity, causing an effective permittivity change in the overall substrate. This overall permittivity change may cause the resonance band of the FSS (frequency selected surface) to shift, producing an electronically controllable phase shift in the reflectarray.

Embodiments of such a tunable structure may be fabricated from a semiconductor layer, such as Si, that is either n-doped or p-doped. In one embodiment, an n+ Si wafer may be doped with Sb to a concentration of $4 \times 10^{18}$ cm$^{-3}$. Such an arrangement provides lower permittivity and a higher loss tangent than low-impurity n Si. The width of the depletion layer (W) may be calculated using a formula of $$W = \sqrt{\frac{2\varepsilon_s}{qN_D}\left(V_{bi} - V - \frac{kT}{q}\right)}$$

where $\varepsilon_s$ is the DC permittivity of Si, $N_D$ is the donor impurity, $V_{bi}$ is the Schottky barrier height, and V is the applied bias potential. Such an embodiment of a semiconductor stand-off substrate 341 may be included in a tunable structure having a film of metal on either side. Embodiments may be fabricated such that the metal film has a slotted structure of the type depicted in FIG. 3a.

In an embodiment according to FIG. 3b, a ground plane or ohmic contact 351, which may be composed of Aluminum, Gold, Nickel, Platinum, Copper, or another suitable metal, is covered with a semiconductor layer 341 composed, in the embodiment shown, of Epitaxial Silicon doped with B, As, P, or other suitable dopants or combinations thereof.

A metallic Schottky contact layer 321 is disposed over the semiconductor layer 341. In some embodiments, the Schottky contact layer may be composed of a metal film such as Aluminum, Gold, Nickel, Copper or Platinum or other metals or combinations thereof. The Schottky contact layer 321 and ohmic contact layer 351 are connected to an electrical source 361 and their interaction creates a depletion region 331 within the semiconductor layer. This layered structure 371 may be used as a tunable ground plane upon which a stand-off layer 311 and reflectarray elements 301 may be disposed. As noted above, changes in the electric field applied to the layered structure 371 cause variations in the size of the depletion region 341 and therefore alter the effective conductivity of the ground plane, allowing for adjustment of the overall phase response of the reflectarray.

In some embodiments, each reflectarray element may be provided with an individually tunable Schottky contact thereby allowing dynamic tuning of individual reflectarray elements by varying the electric field associated with individual Schottky contact regions 371.

An embodiment of a tunable ground plane of this type may be manufactured by various techniques, including electron-beam evaporating a metal film, preferably Al, onto a high-impurity Si wafer. The wafer may then be annealed at high temperature in a noble gas ambient in order to create a eutectic reaction and form an ohmic contact. The opposite side of the wafer may then be covered with a metal film. This is preferably accomplished by hydrogen terminating the wafer and placing it into a vacuum chamber for Pt deposition. Electron-beam lithography may then be employed to pattern elements onto the Pt film surface. The shape of the elements may be rectangular, cruciform, circular, or another shape depending on the application. Size and periodicity of the patterned elements also depends on the desired reflectarray application. One embodiment of a tunable reflectarray of this kind may show up to a ±5% change in reflectivity depending on bias applied. Alternative embodiments may be manufactured using other techniques such as etching and/or plating.

Figure 3C:
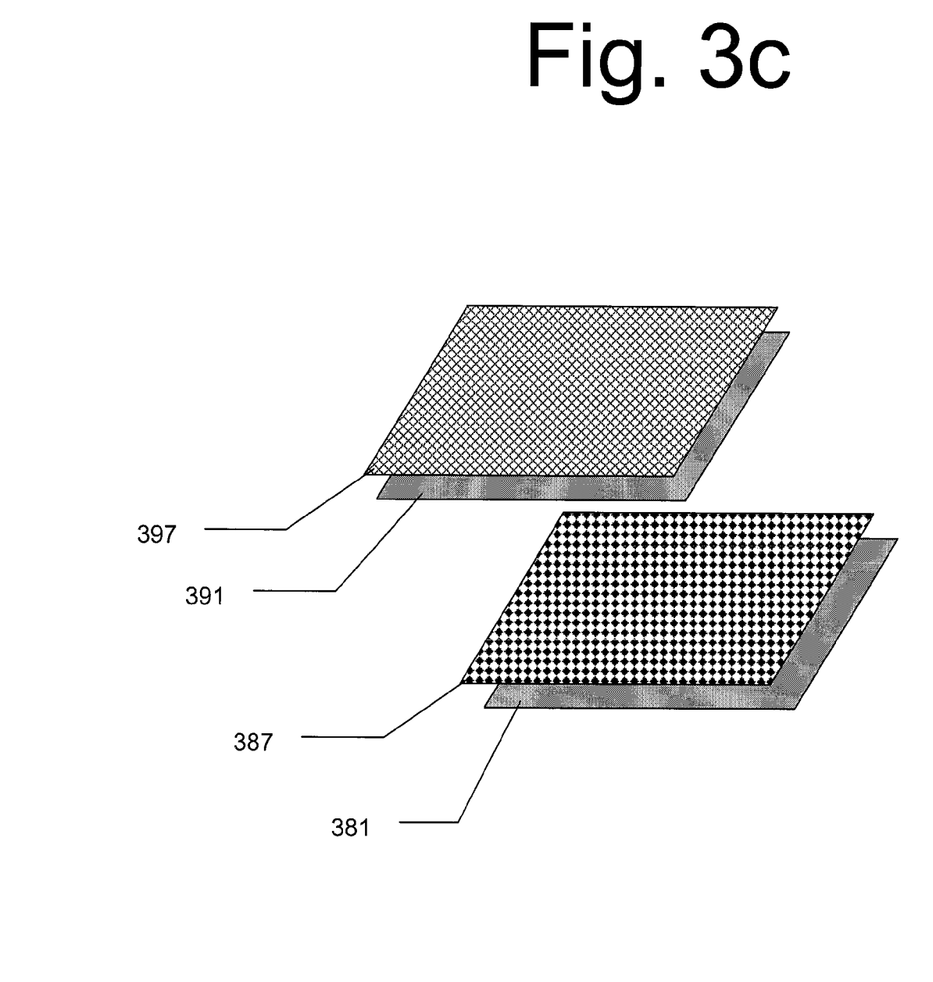
FIG. 3c shows an embodiment of cascaded ohmic surfaces together with semiconductors.

Enhancements to reflectivity adjustment characteristics may be achieved by cascading several ohmic surfaces together with semiconductors such as high donor impurity polycrystalline Si. One possible layout for such an approach may be accomplished by employing a wire grid separated from the previous cross slot groundplane by a layer of n+ Si. An embodiment of such a multi-layer approach is depicted in FIG. 3c.

In the embodiment shown, a layer of metal 397, 387 may be separated by a layer of n+Si in which a depletion region 391, 381 forms. A thickness for this layer may be selected according to reflected wavelength. In the embodiment shown, the metal may be Platinum patterned as a wire grid 397, and the Si layer may have a thickness of λ/4. Alternate embodiments may use different metals, such as gold, copper, silver, or aluminum. Embodiments having such a multi-layered feature may permit a ±10% reflectivity change, allowing for the possibility that an embodiment of a tunable reflectarray having a DC Schottky Contact may provide ~5% change in reflectivity adjustment range per layer.

Figure 4:
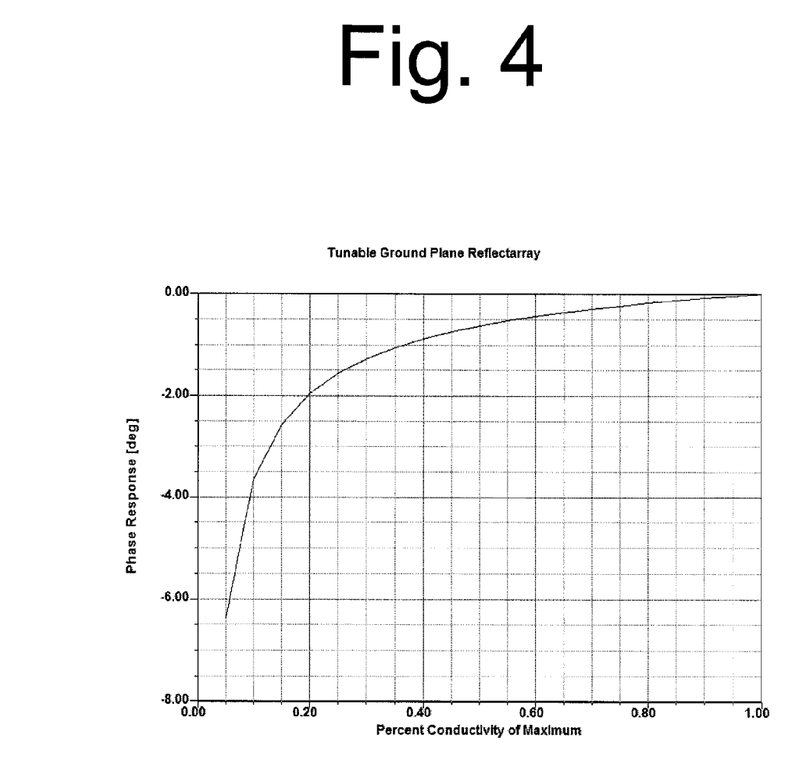
FIG. 4 shows a graph of phase response as a function of ground plane conductivity for an embodiment of a tunable reflectarray according to the present invention.

The amount that a single element will tune in phase is dependent on how much the reflectivity (and, thus, effective conductivity) of the ground plane structure varies. FIG. 4 shows typical results for a structure made entirely of aluminum. Embodiments using other metals may accomplish different variations in phase.

UV Tunable Ground Plane

In an embodiment of a tunable reflectarray that uses a structure similar to that disclosed in the Schottky embodiment, under ultra-violet (UV) illumination the conductivity of a metal ground plane may be dynamically altered for tuning purposes. Embodiments of UV-based techniques may be accomplished with a bias potential across the ground plane, but without periodic elements or secondary ground planes. Some embodiments may even be accomplished without a stand-off layer.

Incident photons with energy greater than the work function of the metal in the ground plane may liberate electrons from core levels in the solid. The application of a voltage bias field may prevent these liberated electrons from escaping. Since conductivity is proportional to the number of free carriers, the photoelectrons may increase the conductivity of the ground plane. This increase in conductivity may result in increased reflectivity while the ground plane is illuminated.

Figure 5:
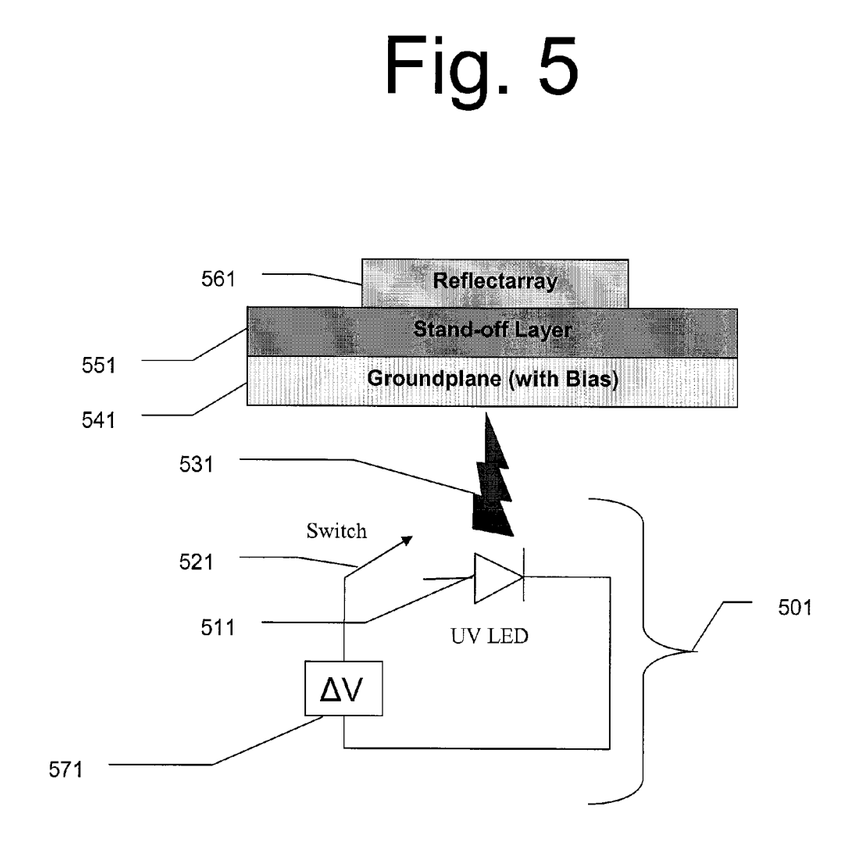
FIG. 5 shows an embodiment of a tunable electro-optical reflectarray with a UV-based ground plane conductivity adjustment paradigm according to the present invention.

Because of the above-described interactions, embodiments of UV-based tuning methods may allow for beam steering similar to the Schottky technique. As depicted in FIG. 5, a UV source 501 for an embodiment of a UV-based tuning approach may be embodied as a directive, deep UV LED 511 or LED array with an additional circuit 521 to regulate the duty cycle of the LED pulses 531. Alternative embodiments of a UV source may include laser sources, Xenon- or Krypton-based light sources, and other sources of illumination with a significant UV component.

A pulsed voltage source 571 may be used to excite a UV LED 511 into emitting a short pulse of UV light. When a UV pulse is triggered, incident photons with energy greater than the work function of the ground plane 541 may liberate electrons from core levels in the solid. A bias field present in the ground plane may prevent these electrons from escaping. Since conductivity is proportional to the number of free carriers, these "liberated" photoelectrons may increase the conductivity of the ground plane. An increased conductivity may result in increased reflectivity while the groundplane is illuminated. A bias field suitable for photoelectron containment may be introduced and maintained in a ground plane by connecting it to a voltage source (not shown). Embodiments of ground planes suitable for use in UV-based tuning embodiments may include metallic films of Au, Al, Ni, Cu, Pt, or any other suitable metal. Embodiments of a bias may be in the range of 20 mA at 5.5V, but other voltage and current combinations may be employed depending on the expected operating conditions and responsiveness of the reflectarray element or elements in question. In some embodiments, bias may vary across the reflectarray to provide further beam-steering capability or control.

The LED may be placed behind a UV transparent substrate such as quartz, salt crystals, or other suitable UV-transparent materials, which may be disposed beneath the ground plane 541. Since the liberation of photoelectrons is a surface effect, slots may be etched into the ground plane to allow the photoelectrons to flow to the interface between the ground plane and the reflectarray stand-off layer 551. In some embodiments of a UV-tuned reflectarray, an array of UV LEDs may be used to activate different reflectarray elements separately or in separately-controlled sub-groups. In yet further embodiments, groups of reflectarray elements may be controlled by individual or coordinated UV sources. Embodiments of UV LEDs may also be equipped with a ball lens for creating directional output, thereby allowing for variations in arrangement and orientation between an LED or LED array and its associated reflectarray element or elements. In further embodiments still, radiation sources other than UV illumination, such as X-ray sources, may be used to change the conductivity of the ground plane.

Photoconductive Elements

Figure 6:
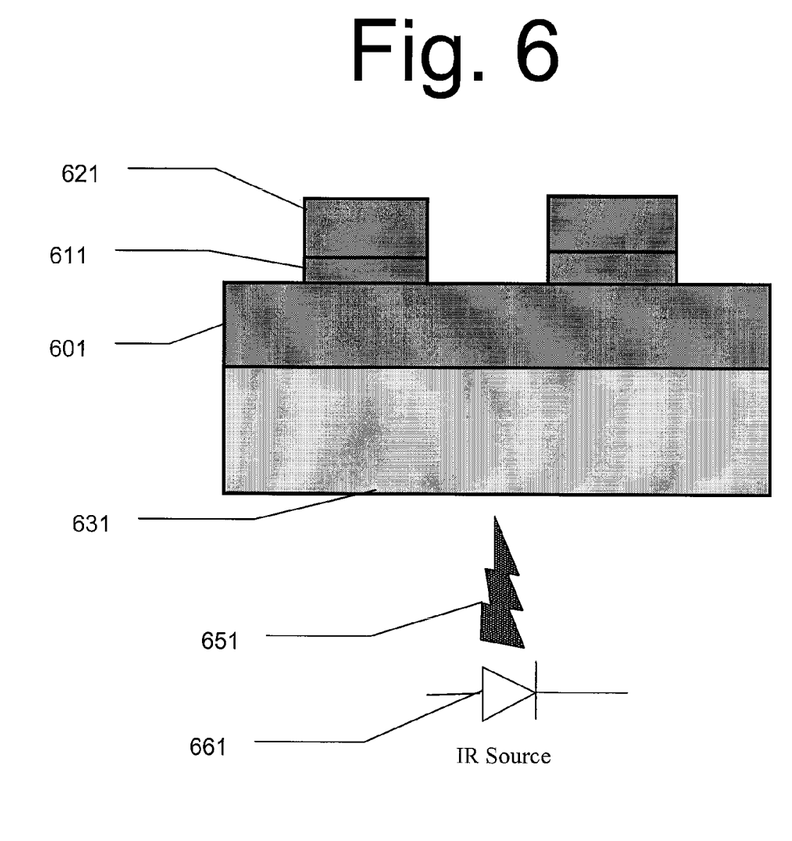
FIG. 6 shows an embodiment of an electro-optical reflectarray with a photoconductively tunable substrate.

Another approach for creating an active reflectarray or waveguiding device involves using photoconductive elements. An embodiment of such an approach is depicted in FIG. 6. Whereas a standard reflectarray or waveguiding device may have a silicon substrate with a layer of native oxide on its surface, on which reflectarray elements 621 may be disposed, either with or without the use of a seed layer 611, a photo-tunable device may have a glass or silica substrate 631 over which an amorphous semiconductor material 601 may be deposited or grown. The reflectarray elements 621, with or without a seed layer 611, are then disposed on the amorphous semiconductor 601.

In the embodiment depicted, the substrate 631 is silicon dioxide and the amorphous semiconductor is hydrogen-fixed silicon that has not been deliberately doped. Alternate embodiments may use a range of infra-red transparent materials such as Si, silica-based glass, polycarbonate, zinc selenide, germanium, sapphire, or diamond for a substrate. Further embodiments still may use a wide range of semiconductor materials, including doped silicon, GaAs, InAs, InSb, GaSb, or similar materials as a photo-absorbing layer. The embodiment depicted employs gold array elements 621 disposed on a titanium seed layer 611. Alternate embodiments may use elements made of different metals or metallic substances such as copper, aluminum, platinum, gold, or silver. Depending on the material used, a seed layer may or may not be necessary. Seed layers may be composed of titanium, thallium or tantalum.

When near IR radiation (~850 nm to 1.1 μm) 651 is incident on a semiconductor such as Silicon (Si), GaAs, InAs, InSb, GaSb, or similar materials, an electron/hole pair is generated for every photon absorbed. During the carrier lifetime the electron/hole pairs may increase the conductivity of a semiconductor wafer via the generation of pseudo-metallic plasma. The change in permittivity of a semiconductor due to the plasma may be calculated at frequency, as well as the increase in conductivity at frequency. The carrier concentration under illumination determines the plasma frequency which is the cutoff frequency for the AC photoconductive effect.

Embodiments of tunable infra-red reflectarrays based on photoconductive elements have properties determined by an extent of induced change in conductivity. In embodiments where a full semiconductor to metal transition is realized, the photoconductive semiconductor may be used effectively as a reflectarray element. In embodiments where the change in conductivity is partial or incomplete, the photoconductive semiconductor may need to be incorporated into a metallic element reflectarray design to achieve a high Q.

One embodiment of a photoconductively tunable reflectarray may employ a Silicon reflectarray element under illumination 651 from a near-IR source 661. Embodiments of a suitable source may include one or more infra-red LEDs, visible-spectrum sources with an infra-red component, or thermal radiation sources. One particular embodiment of a visible spectrum source may include a 100 W quartz halogen bulb having a 3250 C color temperature. Carrier concentration in such an embodiment may be calculated from the DC conductivity using the equation:

$$\sigma_0 = \frac{n\tau q^2}{m^*}$$

where $\sigma_0$ is the DC conductivity, $\tau$ is the collision time, q is the charge of the electron, and m* is the electron effective mass, and n is the concentration of conduction electrons. In this embodiment, $\tau=55$ fs, and $m^*=0.2\ m_0$.

The plasma frequency associated with the permittivity of a semiconductor with the contribution of the plasma is:

$$\varepsilon_r[\omega] = \varepsilon_L[\omega] - \frac{\omega_P^2}{\omega^2 - \frac{1}{\tau^2}} \times \left(1 + \frac{i}{\omega\tau}\right)$$

where $\epsilon_L$ is the dark permittivity of the Si and may be a complex number. The constant $\omega_p$ is the plasma frequency given by the equation:

$$\omega_P^2 = \frac{q^2}{\varepsilon_0} \times \left(\frac{n}{m^*} + \frac{h}{m^*}\right)$$

where n and h are the concentrations of conduction electrons and holes respectively. By measuring carrier concentration via the DC conductivity measurement it may be possible to determine the plasma frequency and hence the contribution to permittivity at IR or any other frequency from the illumination.

In order to push the plasma frequency into the IR range, it is preferable to use semiconductors such as high donor impurity low resistivity Si. Another consideration for alternative embodiments of photoconductively tunable reflectarrays is the thickness of the semiconductor. Embodiments of such reflectarrays preferably employ thin films of semiconductor materials. In a thin film semiconductor such as Si, the plasma may be concentrated throughout the volume, which may lead to an enhanced effect with respect to photoconductivity.

Design Flow for Dynamic Reflectarray

In one embodiment of a manufacturing process for dynamic reflectarrays, photoconductive elements may be used to fabricate a dynamic reflectarray that is tuned by a near IR to visible pump illumination source. In some embodiments, the photoconductive elements may include Si or Ge. Elements that contain Si are cheaper and may have well known processing recipes; while elements containing Ge are more expensive but may have a longer recombination lifetime as well as a higher intrinsic carrier density. In some embodiments, elements containing high donor impurity (degenerate) semiconductors may be preferred to achieve photoconductive properties in the IR.

There are many ways to integrate photoconductive layers or elements with reflectarray technology. One possible approach may begin by fabricating one or more layers of the reflectarray as though for a static design. Some embodiments of such an approach may include the groundplane as well as the standoff layer. Possibilities for the standoff material in such an approach may include BCB, which may tolerate processing temperatures as high as 350° C. Possibilities for a ground plane include metallic aluminum, gold, nickel, copper, platinum, and other similar metals or metallic compounds.

For embodiments that integrate photoconductive Si or Ge with metallic reflectarray elements, amorphous semiconductor materials may be preferred in manufacturing processes conducted at less than 300° C. Embodiments of manufacturing processes that employ CVD (chemical vapor deposition) processing for crystalline Si or Ge done at more than 1000° C. may cause the formation of undesirable silicides via the diffusion of the metallic elements into the semiconductor.

Embodiments of manufacturing processes that employ amorphous Si deposition through electron beam evaporation may yield a high density of dangling bonds in the amorphous network. These dangling bonds may recombine with carriers and prevent the semiconductor from have a majority carrier type or photoconductive properties. Some embodiments of manufacturing processes may employ a hydrogen passivation process to counteract such dangling bond issues. Embodiments of hydrogen passivation processes may include an e-beam evaporation system with a partial pressure of hydrogen and an ion assist system. Pure hydrogen may be used as the reactive gas and, in ion-assist embodiments, may be heated upon entering the vacuum chamber. Embodiments of the resulting material generated by such a passivation process may be hydrogenated amorphous Si or Ge (a-Si:H or a-Ge:H) and may contain approximately a 12% atomic fraction of hydrogen.

There are various embodiments of processing methods that include depositing a-Si:H containing a high level of n type donor impurities. One such method uses n+ Si as an evaporant. Such Si may be doped by the inclusion of impurities during the growth process.

A high donor impurity may also be introduced in a two evaporation source system through the simultaneous evaporation of a group V element (such as a phosphorus or antimony compound) during the deposition of the amorphous silicon. In some embodiments, donor evaporation may be conducted at a lower rate such that the donor impurity is at the part per million level. Yet further embodiments may employ ion implantation techniques to dope semiconductors.

Some embodiments of a manufacturing process for creating a dynamic infra-red reflectarray may employ a lithography process to fabricate metallic square loops. For photoconductive elements a second layer of lithography may be used to load the reflectarray elements with a photoconductive cross.

Although discussed embodiments are mainly directed to reflectarrays usable in the near-IR and mid-wave infra-red ranges, the techniques discussed herein are equally applicable to wavelength ranges from ultra-violet to long-wave infra-red.

In some embodiments, BCB and aluminum may be used in development of Near Infra-Red reflectarray elements. One embodiment of an NIR reflectarray may utilize a 200 nm BCB stand-off layer with a unit cell length of 0.8 μm. Although not required, some embodiments of this type may operate more effectively with a uniform layer of BCB.

Some embodiments of MWIR reflectarrays may be fabricated using two layers of thinned BCB. Some embodiments of MWIR reflectarrays may also be fabricated with a small element size. Although useful for improved resolution and higher degrees of precision with respect to tuning, small element size is not essential for proper function of an MWIR reflectarray.

Adaptive Controller

Figure 7:
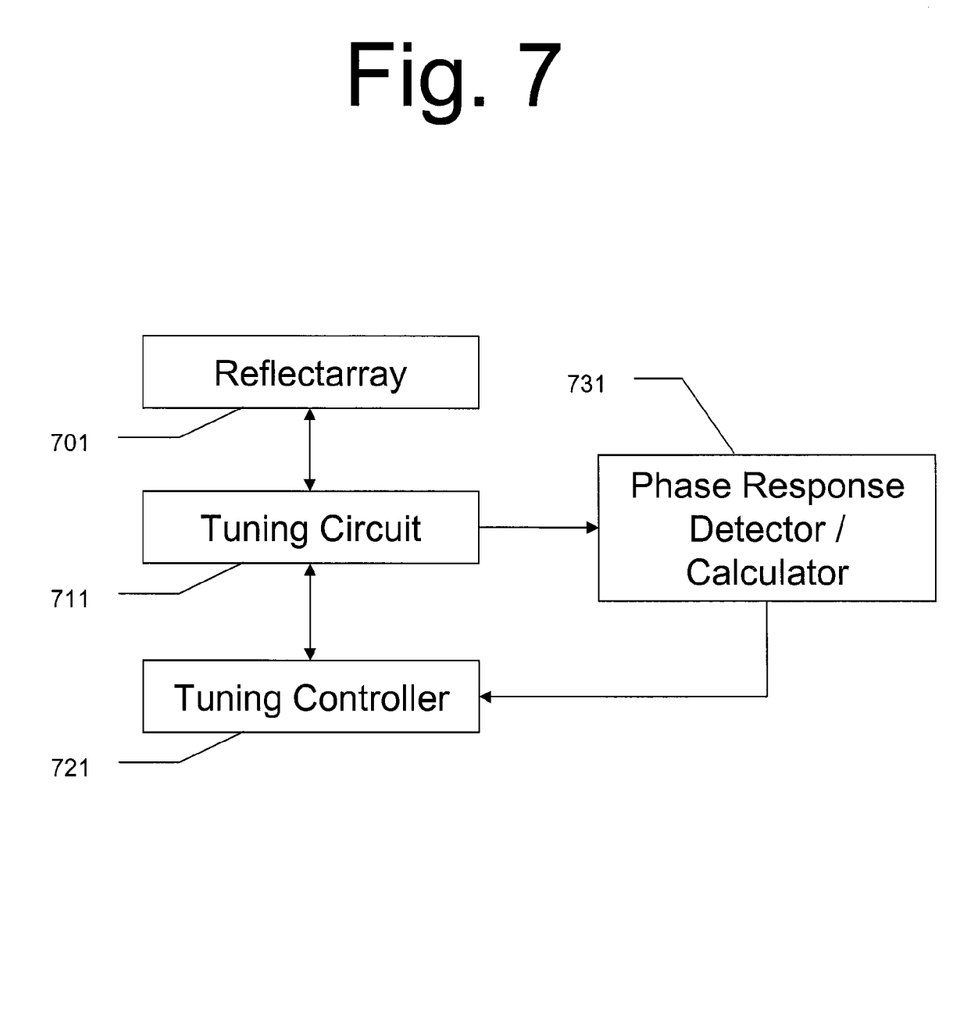
FIG. 7 shows an embodiment of an adaptive controller for dynamic array tuning during operation.

The above-described tunable reflectarray embodiments may be separately or jointly controlled, during array operation, with an adaptive controller that allows for manual, semi-automatic, or fully automated dynamic array tuning to vary its phase response based on user preferences, detected operating conditions or threshold parameters, or according to predetermined operating profiles. An embodiment of such an adaptive control system is depicted in FIG. 7.

A tunable reflectarray 701 according to any of the above-described embodiments may be connected to a tuning circuit 711 that controls the appropriate biases and/or photo-emissive devices to establish a desired phase response or set of phase responses in the reflectarray elements. Embodiments of a tuning circuit may control the tunable parameters of one or more reflectarray elements or reflectarrays through control signals associated with particular tunable parameters or adjustments thereto.

An embodiment of a tuning circuit 711 may be connected to a tuning controller 721 that directs the operation of the tuning circuit. The controller may be manually operated or programmable, and, in some embodiments, may be part of an integrated component that also includes the tuning circuit. The controller may also receive input from a phase response detector and/or calculator device 731 that determines, based on either input from the tuning circuit and/or input from the reflectarray at least one of a current or desired phase response level.

Embodiments of phase response detection may include an open-loop control paradigm whereby particular control signals output from a tuning circuit are associated with a previously measured or known phase response for a given reflectarray or reflectarray portion. The phase response detection may then be accomplished by providing control outputs from the tuning circuit associated with a desired phase response as known from prior measurement.

Alternate embodiments may employ a feedback control paradigm where the actual permittivity or conductivity in a ground plane, superstrate, or stand-off layer associated with one or more reflectarray elements is measured or inferred from associated electrical parameters. In such an embodiment, an actual phase response or its associated electrical parameters may be compared to a desired or target phase response or electrical parameters associated with a desired phase response, and the control outputs of the tuning circuit may then be adjusted accordingly.

Yet further embodiments may integrate some level of actual phase response measurement, phase difference calculation (e.g. actual vs. desired or expected based on an operating program or a particular control output), and automated tuning control into the tuning circuit to allow for feedback-based turning correction and/or compensation for noise, power fluctuations, electro-magnetic interference, and other similar phenomena.

The phase response detector 731, tuning controller 721, and tuning circuit 711 may be separate components or may be fully or partially integrated portions of control devices or part of the overall reflectarray control electronics. In some embodiments, the components may be modular and designed for easy replacement or portability. In manually controllable embodiments, a phase response detector/calculator may be omitted or may be part of a separate control interface connected to the tuning controller.

In yet further embodiments, a tuning controller may be associated with multiple tuning circuits and/or multiple phase response detector/calculators. Embodiments of a phase response detector/calculator may also be equipped with a capability to determine the phase response of multiple array portions or of multiple, separate arrays. Embodiments of tuning circuits may also be associated with entire arrays, with sub-portions of an array, or with multiple arrays.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A tunable electro-optical radiation reflecting device, said device element comprising:
a ground plane;
a stand-off layer disposed above said ground plane;
an array consisting of a plurality of reflecting elements, each element of said plurality having a phase response that is regulated by at least one of:
the conductivity or permittivity of the ground plane,
the response of the reflecting element by itself, and
inter-element coupling between the element and the rest of said plurality of elements;
where each of said plurality of elements has a size less than or equal to a wavelength of the electro-optical radiation reflected by said element; and
where the phase response of at least one of said plurality of elements changes during operation of said reflectarray.

2. The device of claim 1, said device further including:
a liquid-crystal superstrate disposed on top of at least one element;
where said superstrate has a permittivity that is varied by controlling a bias voltage; and
where changes in the permittivity of the superstrate cause changes in the phase response of the element.

3. The device of claim 1, the ground plane being a Schottky contact tunable ground plane that includes:
an ohmic contact layer;
a semiconductor layer;
a Schottky contact layer;
a bias voltage source connected to said Schottky contact layer and said ohmic contact layer; and
a depletion region between said semiconductor layer and said Schottky contact layer, the size of said depletion region being determined by at least one of the composition of said semiconductor layer and the bias voltage applied;
wherein as the bias voltage changes, a permittivity of the ground plane changes, thereby altering the phase response of at least one element.

4. The device of claim 1, the device further including:
a pulsed ultra-violet radiation source disposed beneath the ground plane;
where the conductivity of the ground plane changes based on the amount and rate of ultra-violet radiation exposure, thereby altering the phase response of at least one element.

5. The device of claim 1, where:
the ground plane comprises an electro-optically transparent material;
the stand-off layer comprises a photo-conductive material;
and the array further includes an electro-optical radiation source disposed such that electro-optical radiation passes through the ground plane and is absorbed by the stand-off layer;
wherein photo-absorption by the stand-off layer changes its permittivity, thereby altering the phase response of at least one element disposed thereon.

6. The device of claim 1, at least one of said elements including gold.

7. The device of claim 1, said ground plane including aluminum.

8. The device of claim 2, said superstrate being a multi-layered structure that includes liquid crystal disposed between layers of polyimide.

9. The device of claim 3, said ground plane further including:
a second ohmic contact layer; and
a second semiconductor layer;
where the second ohmic contact and semiconductor layers are disposed beneath the ohmic contact and semiconductor layers.

10. The device of claim 9, where the semiconductor layer and second semiconductor layer are both composed of high donor impurity polycrystalline silicon.

11. The device of claim 3, where said ohmic contact layer is platinum.

12. The device of claim 3, where said Schottky contact layer is aluminum.

13. The device of claim 3, where said semiconductor layer is n+ Silicon.

14. The device of claim 4, where said ground plane is aluminum.

15. The device of claim 4, where said ultra-violet radiation source is a UV LED.

16. The device of claim 5, where said ground plane is $SiO_2$ and said electro-optical radiation source is an infra-red source.

17. The device of claim 2, said superstrate being configured such that it covers at least two reflecting elements.

18. The device of claim 9, said ground plane further including at least a third ohmic contact layer and at least a third semiconductor layer, said third ohmic contact and semiconductor layers being disposed beneath said second ohmic contact and semiconductor layers.

19. The device of claim 1, where said electro-optical radiation is infra-red radiation.

20. The device of claim 1, the device further comprising an adaptive controller that changes the phase response of said at least one element.

21. The device of claim 20, where the controller changes the phase response of said at least one element based on at least one of a present phase response and a desired phase response of said element.

22. A method of adjusting a phase response of a reflecting element in an electro-optical reflectarray having a plurality of reflecting elements, a stand-off layer, and a ground plane, the method comprising:
  altering the permittivity of at least a portion of either the stand-off layer or the ground plane, thereby changing the phase response of at least one reflecting element disposed on said stand-off layer.

23. The method of claim 22, where altering includes providing a control signal from an adaptive controller based on a desired phase response for said element.

24. A method of adjusting a phase response of a reflecting element in an electro-optical reflectarray having a plurality of reflecting elements, a stand-off layer, a ground plane, and a liquid-crystal superstrate disposed on top of said reflecting elements, the method comprising:
  changing a bias voltage between said superstrate and said ground plane, thereby altering the permittivity of at least a portion of said superstrate, where changes in the permittivity of said superstrate alter the phase response of the reflecting elements covered thereby.

25. The method of claim 24, where changing includes providing a control signal from an adaptive controller based on a desired phase response for said element.

* * * * *